March 31, 1942. H. O. CAMBRIDGE 2,277,843
WHEEL MOUNTING
Filed April 5, 1940
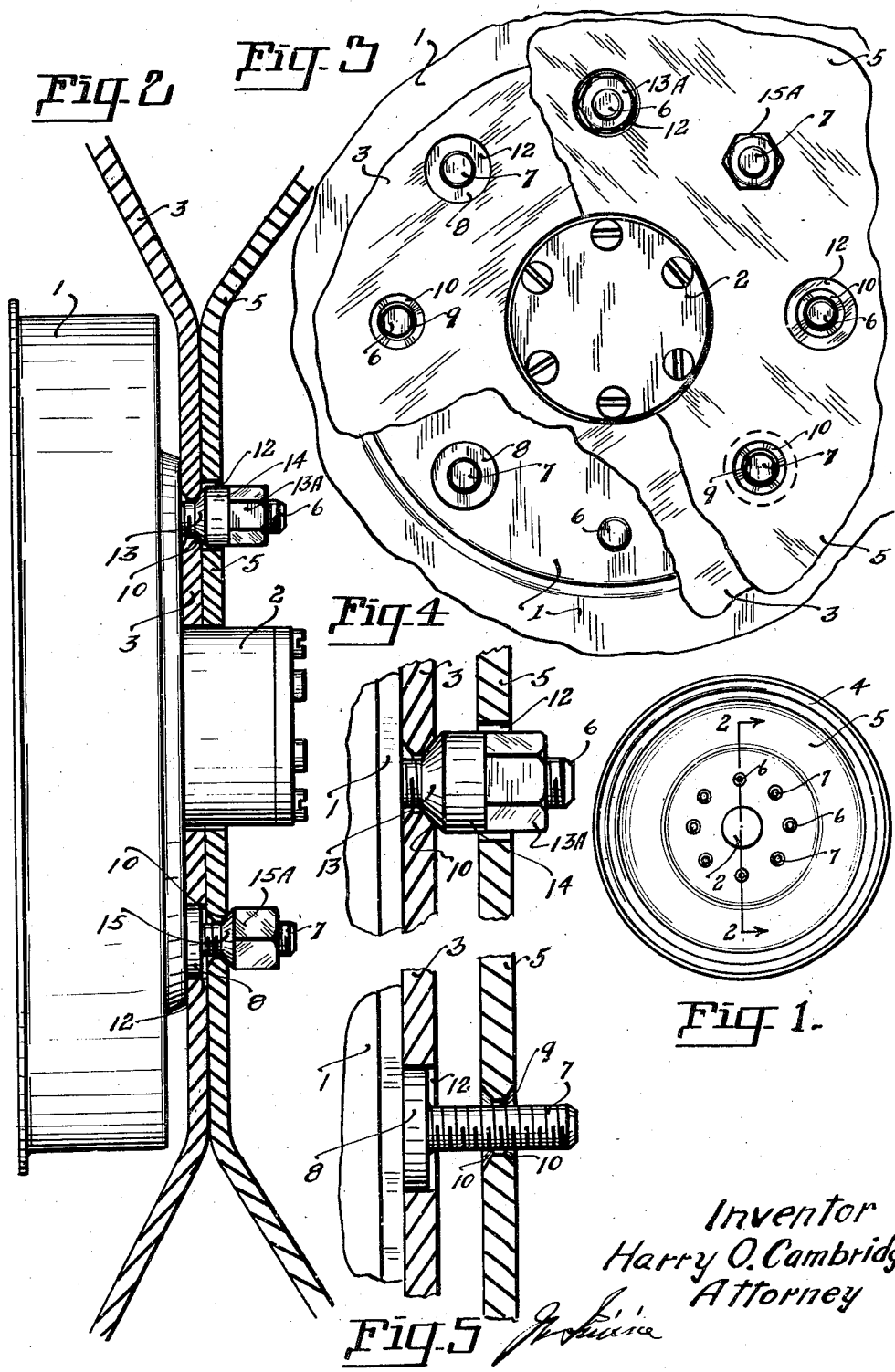
Inventor
Harry O. Cambridge
Attorney Patented Mar. 31, 1942

2,277,843

UNITED STATES PATENT OFFICE 2,277,843

WHEEL MOUNTING

Harry O. Cambridge, Chehalis, Wash.

Application April 5, 1940, Serial No. 328,104

4 Claims. (Cl. 301—36)

This invention relates to wheel mountings and the primary object of the invention is to provide a mounting for dual wheels that will secure each wheel securely in place.

Another object of the invention is to provide a method of mounting the wheels to the hub where each wheel is held in place by a separate set of nuts, all of which are accessible from the outside of the wheel mounting.

A still further object of the invention is to provide a wheel mounting that will prevent any movement between the wheels being mounted.

These and other incidental objects will be apparent in the drawing, claims and specification to follow.

Referring to the drawing:

Figure 1 is a side elevation of a standard disc wheel, having the tire removed.

Figure 2 is a fragmentary view, partially in section, taken on line 2—2 of Figure 1.

Figure 3 is a fragmentary view of the hub mounting, parts broken away for convenience of illustration.

Figure 4 is a fragmentary sectional detail view of one of the fastening studs for holding the wheels in place.

Figure 5 is a fragmentary detail view of one of the fastening studs positioning the wheels in place in the process of mounting.

In the drawing:

1 is a standard brake drum, having the usual hub 2 thereon. 3 is the body or disc of the wheel 4 next to the drum 1. The outside disc 5 forms the body of the outer wheel. I illustrate two types of stud bolts 6 and 7 in my drawing, one of these stud bolts having a shoulder 8 adjacent its base. The purpose of this shoulder is to act as a dowel pin holding the inner disc wheel against rotation, especially in heavy duty work. I do not wish to be limited to using this shoulder in connection with a stud bolt, as it is not absolutely necessary in some cases.

It will be noted in the drawing, referring to Figures 2 and 3, that each other hole in the disc is differently designed. The hole 9 is just large enough to pass over the stud bolt and has a tapered face 10 on both sides of the disc. Adjacent hole 12 is a larger hole and is cut through straight. Both disc wheels are designed exactly alike, one large hole and one small hole.

The inner disc wheel 3 is placed on the stud bolts, the tapered surface 13 of the nut 13A is then cinched up tightly against the taper 10 of the hole 9 securely holding the disc in place. It will be noted that the hole 12 of the disc 3 passes over the shoulder 8 of the stud bolt 7. The shoulder 8 acts as a dowel for preventing the disc 3 from rotating. The outer wheel 5 is then mounted in place. The portion 14 of the nut 13A acts as a dowel pin within the hole 12 of the disc 5. The tapered surface 15 of the nut 15A is then cinched in place against the tapered surface 10 of the hole 9, holding the outer disc in place. Nuts 13A and 15A are accessible from the outside of the wheel mounting. Each set of these nuts hold the disc against the drum 1 individually, except that when the nuts 15A are locked in place they assist in further holding the inner disc wheel 3 in locked position.

I do not wish to be limited to the exact construction, as shown and described, as other mechanical equivalents may be used, still coming within the scope of the claims to follow.

What is claimed as new is:

1. Means for securing dual wheels to a vehicle to permit their independent removal from the outer surface of the wheel, comprising independent wheels, each having similar sets of openings, one of circular peripheral edge, the other of conical peripheral edge, the wheels being arranged with their non-similar openings in alignment, and securing means cooperating with the aligned openings, one set of securing means preventing independent rotation of the inner wheel and locking the outer wheel against axial movement and the other set of securing means locking the inner wheel against axial movement and preventing independent rotative movement of the outer wheel.

2. A construction as defined in claim 1 wherein the securing means includes a dowel form for the circular openings and a conical form for the conical openings.

3. A construction as defined in claim 1 wherein the securing means includes threaded studs fixed to the vehicle and two sets of nuts cooperating with such studs, with one presenting a locking part for the conical openings of the inner wheel.

4. A construction as defined in claim 1 wherein the securing means includes threaded studs fixed to the vehicle and two sets of nuts cooperating with such studs, with one presenting a locking part for the conical openings of the inner wheel, and the other presenting a conical part for the conical opening of the outer wheel.

HARRY O. CAMBRIDGE.